US011715402B2

(12) United States Patent
Yang et al.

(10) Patent No.: US 11,715,402 B2
(45) Date of Patent: Aug. 1, 2023

(54) ELECTRONIC DEVICE WITH DISPLAY PANEL AND CONTROL METHOD FOR UPDATING BRIGHTNESS LIMIT OF DISPLAY PANEL BASED ON TEMPERATURE

(71) Applicant: ASUSTeK COMPUTER INC., Taipei (TW)

(72) Inventors: Chia-Feng Yang, Taipei (TW); Chin-An Tseng, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 17/711,160

(22) Filed: Apr. 1, 2022

(65) Prior Publication Data
US 2022/0327978 A1   Oct. 13, 2022

(30) Foreign Application Priority Data
Apr. 13, 2021   (TW) .................................. 110113286

(51) Int. Cl.
*G09G 3/20* (2006.01)
*G01K 1/02* (2021.01)
*G01K 3/00* (2006.01)

(52) U.S. Cl.
CPC .............. *G09G 3/20* (2013.01); *G01K 1/026* (2013.01); *G01K 3/005* (2013.01); *G09G 2320/0233* (2013.01); *G09G 2320/041* (2013.01); *G09G 2320/046* (2013.01)

(58) Field of Classification Search
None
See application file for complete search history.

(56) References Cited

U.S. PATENT DOCUMENTS

| 10,062,324 | B2 | 8/2018 | Kim et al. | |
|---|---|---|---|---|
| 2010/0060861 | A1* | 3/2010 | Medin | H04N 9/3144 353/57 |
| 2012/0242633 | A1* | 9/2012 | Kim | G09G 3/20 345/207 |
| 2013/0141351 | A1* | 6/2013 | Aisaka | G09G 5/10 345/173 |
| 2013/0321361 | A1* | 12/2013 | Lynch | G09G 3/3225 345/204 |

(Continued)

FOREIGN PATENT DOCUMENTS

| CN | 103295535 A | 9/2013 |
|---|---|---|
| CN | 106094932 B | 9/2018 |

(Continued)

*Primary Examiner* — Benjamin C Lee
*Assistant Examiner* — Emily J Frank
(74) *Attorney, Agent, or Firm* — McClure, Qualey & Rodack, LLP

(57) ABSTRACT

An electronic device is provided, including a display panel and a processor. The processor is coupled to the display panel, and is configured to calculate an average temperature of the display panel, where when the average temperature is greater than a first temperature threshold, the processor adjusts an upper brightness limit of the display panel to a first adjusted maximum brightness value, so that brightness of the display panel is not greater than the first adjusted maximum brightness value. The disclosure further provides a display panel control method for an electronic device.

10 Claims, 4 Drawing Sheets

(56) References Cited

U.S. PATENT DOCUMENTS

| | | | | |
|---|---|---|---|---|
| 2016/0293102 A1* | 10/2016 | Chaji | ................ | G09G 3/20 |
| 2018/0190187 A1* | 7/2018 | Hack | ................ | G09G 3/3208 |
| 2019/0189042 A1* | 6/2019 | Aurongzeb | ........ | G06F 1/1681 |
| 2020/0043427 A1* | 2/2020 | Zhong | ................ | G09G 3/36 |

FOREIGN PATENT DOCUMENTS

| | | |
|---|---|---|
| CN | 105609057 B | 3/2019 |
| CN | 106875921 B | 3/2019 |
| CN | 109754752 B | 9/2020 |
| TW | 201832196 A | 9/2018 |

\* cited by examiner

ELECTRONIC DEVICE WITH DISPLAY PANEL AND CONTROL METHOD FOR UPDATING BRIGHTNESS LIMIT OF DISPLAY PANEL BASED ON TEMPERATURE

CROSS-REFERENCE TO RELATED APPLICATION

This application claims the priority benefit of Taiwan application serial No. 110113286, filed on Apr. 13, 2021. The entirety of the above-mentioned patent application is hereby incorporated by reference herein and made a part of the specification.

BACKGROUND OF THE INVENTION

Field of the Invention

The disclosure relates to an electronic device, and in particular, to an electronic device with a display panel.

Description of the Related Art

With the rise of thin and light notebook computers, heat dissipation outlets of many notebook computers are arranged on rear sides of the notebook computers (i.e., sides far away from users), to prevent discharged hot air from directly affecting the users. However, such a design causes a phenomenon that the heat dissipation outlets are excessively close to the display panels so that the display panels are often at excessively high temperatures, thereby causing a problem of a shortened service life or afterimages on screens.

BRIEF SUMMARY OF THE INVENTION

An aspect of the disclosure is an electronic device. The electronic device includes a display panel and a processor. The processor is coupled to the display panel, and is configured to calculate an average temperature of the display panel, where when the average temperature is greater than a first temperature threshold, the processor adjusts an upper brightness limit of the display panel to a first adjusted maximum brightness value, so that brightness of the display panel is not greater than the first adjusted maximum brightness value.

Another aspect of the disclosure is a display panel control method. The display panel control method is applicable to an electronic device, and includes the following steps: calculating an average temperature of a display panel of the electronic device; correcting an original maximum brightness value of the display panel to a first adjusted maximum brightness value when the average temperature is greater than a first temperature threshold; and correcting, When current brightness of the display panel is greater than the first adjusted maximum brightness value, the current brightness of the display panel so that the current brightness of the display panel is not greater than the first adjusted maximum brightness value.

In conclusion, an electronic device of the disclosure selectively corrects an original maximum brightness value of a display panel according to a result of comparison between an average temperature of the display panel and a temperature threshold, to prolong a service life of the display panel and reduce occurrence of afterimages.

DETAILED DESCRIPTION OF THE EMBODIMENTS

Figure 1:
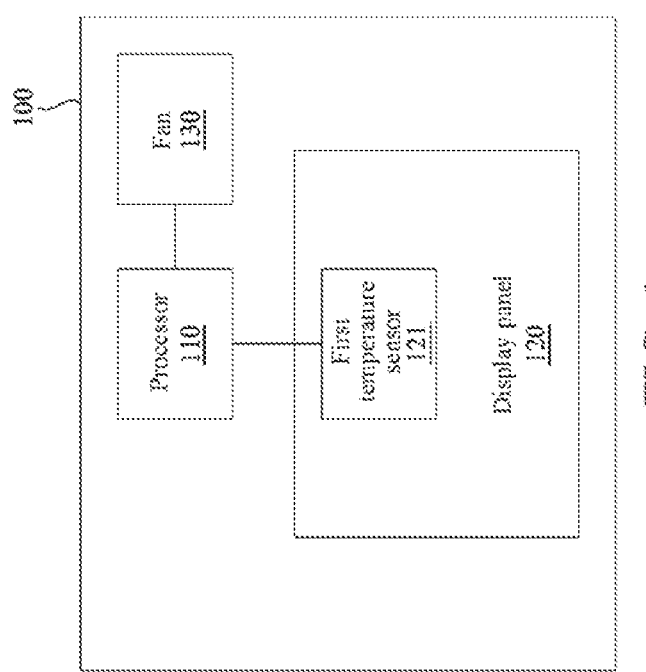
FIG. 1 is a block diagram of an electronic device according to some embodiments of the disclosure.

Referring to FIG. 1, an electronic device 100 includes a processor 110, a display panel 120, and a fan 130. The processor 110 is coupled to the display panel 120 and the fan 130. In some embodiments, the electronic device 100 is a notebook computer, and the processor 110 controls the display panel 120 to output information, and controls the fan 130 to run to dissipate heat inside the electronic device 100.

As shown in FIG. 1, in an embodiment, the display panel 120 is coupled to a first temperature sensor 121. The first temperature sensor 121 is configured to detect a temperature of the display panel 120 to generate a first temperature value, and provide the first temperature value to the processor 110. The processor 110 performs calculation according to the received first temperature value, to determine whether to adjust an upper brightness limit of the display panel 120.

Figure 2:
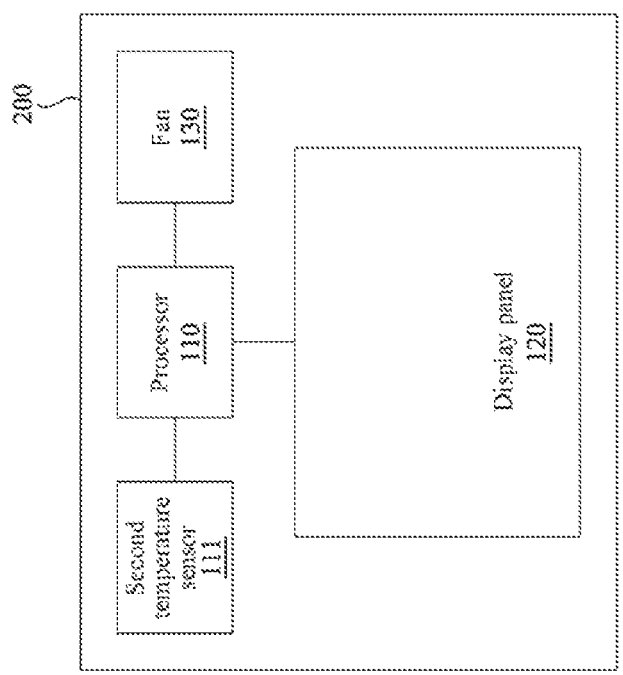
FIG. 2 is a block diagram of another electronic device according to some other embodiments of the disclosure.

Referring to FIG. 2, in an embodiment, a processor 110 is coupled to a second temperature sensor 111. The second temperature sensor 111 is configured to detect a temperature of the processor 110 to generate a second temperature value, and provide the second temperature value to the processor 110. The processor 110 converts the received second temperature value into a panel temperature value (i.e., a temperature value of a display panel 120), and performs calculation according to the panel temperature value, to determine whether to adjust an upper brightness limit of the display panel 120.

In some other embodiments, a processor 110 in an electronic device 100 or an electronic device 200 also records a rotation speed value of a fan 130, converts the rotation speed value of the fan 130 into a panel temperature value, and performs calculation according to the panel temperature value, to determine whether to adjust an upper brightness limit of a display panel 120.

Figure 3:
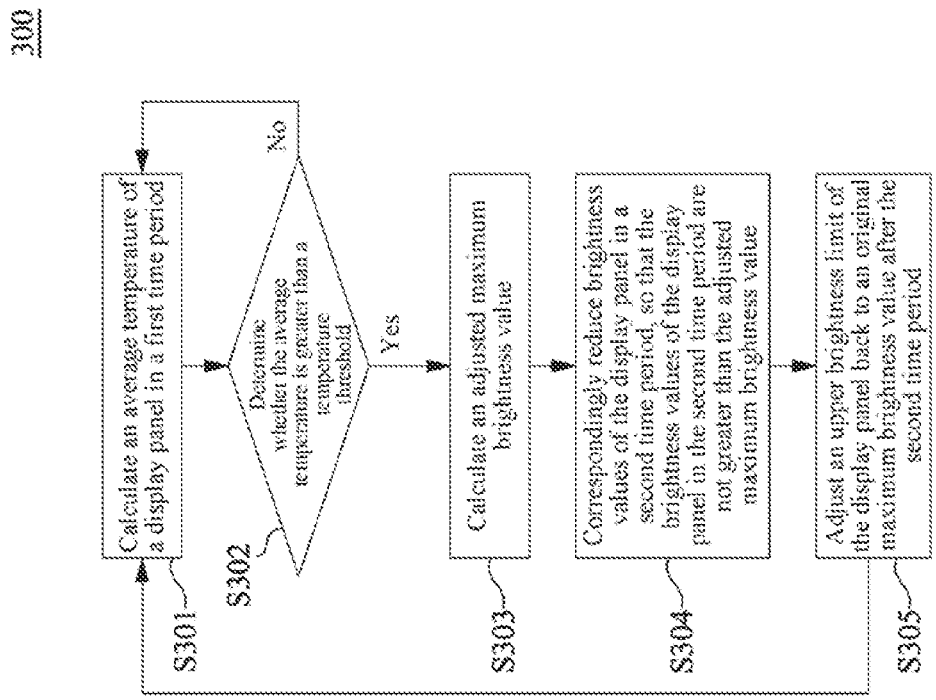
FIG. 3 is a flowchart of a display panel control method for an electronic device according to some embodiments of the disclosure.

FIG. 3 describes a flowchart of a display panel control method 300 according to an embodiment of the disclosure. The electronic device in the foregoing embodiments performs related steps according to the display panel control method 300, to determine whether to adjust the upper brightness limit of the display panel 120. As shown in FIG. 3, the display panel control method 300 includes steps S301 to S305.

In step S301, a processor 110 calculates an average temperature of a display panel 120 in a first time period. As shown in FIG. 1, in some embodiments, the processor 110 calculates the average temperature (in an embodiment, 47° C.) of the display panel 120 according to a plurality of first temperature values (in an embodiment, a first temperature value at the $10^{th}$ minute is 47° C., a first temperature value at the $20^{th}$ minute is 50° C., and a first temperature value at the 30$^{th}$ minute is 44° C.) of the display panel 120 outputted by the first temperature sensor 121 in the first time period (in an embodiment, 30 minutes).

As shown in FIG. 2, in an embodiment, the processor 110 receives a plurality of temperature values (i.e., foregoing second temperature values) of the processor outputted by the second temperature sensor 111 in the first time period (in an embodiment, 30 minutes), and converts the second temperature values into panel temperature values by using a numerical analysis method (in an embodiment, an interpolation method or another mathematical formula) according to a temperature conversion table (not shown in the figure) of the processor and the display panel, to calculate the average temperature of the display panel 120.

In some other embodiments, the processor 110 records a plurality of rotation speed values (in an embodiment, a rotation speed value at the 10$^{th}$ minute is 4300 RPM, a rotation speed value at the 20$^{th}$ minute is 5000 RPM, and a rotation speed value at the 30$^{th}$ minute is 4400 RPM) of the fan 130 in the first time period (in an embodiment, 30 minutes), and converts the rotation speed values into corresponding panel temperature values (in an embodiment, a panel temperature value at the 10$^{th}$ minute is 42° C., a panel temperature value at the 20$^{th}$ minute is 44.9° C., and a panel temperature value at the 30$^{th}$ minute is 44.8° C.) by using a numerical analysis method (in an embodiment, an interpolation method or another mathematical formula) according to the rotation speed values and a fan rotation speed and temperature conversion table (not shown in the figure), to further calculate the average temperature (in an embodiment, 43.9° C.) of the display panel 120 according to the panel temperature values.

In step S302, the processor 110 determines whether the average temperature of the display panel 120 is greater than a temperature threshold. When the average temperature (in an embodiment, 47° C.) of the display panel 120 is greater than the temperature threshold (in an embodiment, 45° C.), step S303 is performed. In step S303, the processor 110 calculates an adjusted maximum brightness value. In an embodiment, the adjusted maximum brightness value (in an embodiment, 320 nits) is less than an original maximum brightness value (in an embodiment, 400 nits) of the display panel 120, and the original maximum brightness value is attainable maximum brightness of the display panel 120 that is set before delivery. In an embodiment, the adjusted maximum brightness value is inferred from a service life curve of the display panel 120 at different temperatures. In an embodiment, when the average temperature (in an embodiment, 50° C.) of the display panel 120 exceeds the temperature threshold by 5° C., decrease in brightness by 20% enables a service life of the display panel 120 to be equivalent to that when the average temperature (in an embodiment, 45° C.) is equal to the temperature threshold. Then, the processor 110 reduces an upper brightness limit by 20%.

It is to be noted that the adjusted maximum brightness value and the temperature threshold are determined by analyzing a relationship among the brightness, the temperature, and the service life of the display panel 120. When the average temperature (in an embodiment, 43.9° C.) of the display panel 120 is not greater than the temperature threshold (in an embodiment, 45° C.), the adjusted maximum brightness value is not calculated, and step S301 is performed again.

In step S304, the processor 110 correspondingly reduces brightness values of the display panel 120 in a second time period (after the first time period) according to the adjusted maximum brightness value, so that the brightness values of the display panel 120 in the second time period are not greater than the adjusted maximum brightness value. In an embodiment, the processor 110 reduces brightness values which exceed the adjusted maximum brightness value in the brightness values of the display panel 120 in the second time period to the adjusted maximum brightness value. In an embodiment, the processor 110 multiplies all the brightness values of the display panel 120 in the second time period by an adjustment parameter to reduce all the brightness values, where the adjustment parameter is less than 1.

In an embodiment, in step S304, the processor 110 reduces an upper brightness limit of the display panel 120 in the second time period directly from the original maximum brightness value (350 nits) to the adjusted maximum brightness value (320 nits). In an embodiment, in step S304, the processor 110 gradually reduces the upper brightness limit of the display panel 120 in the second time period from the original maximum brightness value to the adjusted maximum brightness value within an adjustment time interval. In an embodiment, the processor 110 first reduces the upper brightness limit of the display panel 120 from 350 nits to 335 nits, and then reduces the upper brightness limit of the display panel 120 from 335 nits to 320 nits.

As shown in step S305, after the second time period, the processor 110 adjusts the upper brightness limit back to the original maximum brightness value, to perform step S301 again.

In the embodiment shown in FIG. 3, regardless of how many degrees the average temperature of the display panel 120 is, as long as the average temperature of the display panel 120 (in an embodiment, 47° C., 52° C., or 57° C.) is greater than the temperature threshold (in an embodiment, 45° C.), the processor 110 corrects the upper brightness limit of the display panel 120 to the adjusted maximum brightness value.

Figure 4:
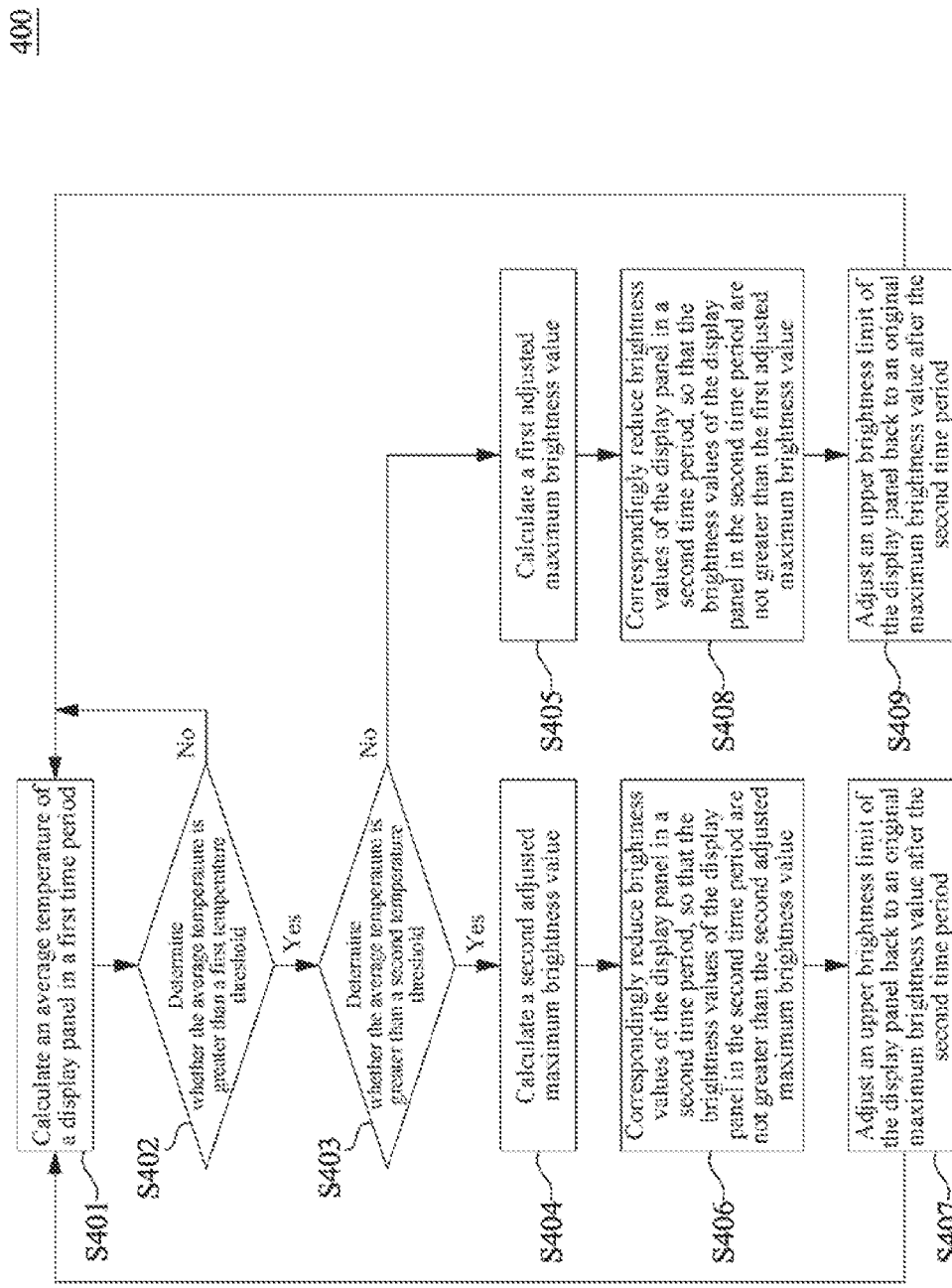
FIG. 4 is a flowchart of another display panel control method for an electronic device according to some other embodiments of the disclosure.

FIG. 4 describes a flowchart of a display panel control method 400 according to another embodiment of the disclosure. The electronic device in the foregoing embodiments further performs related steps according to the display panel control method 400, to determine whether to adjust the upper brightness limit of the display panel 120. As shown in FIG. 4, the display panel control method 400 includes steps S401 to S409.

In step S401, a processor 110 calculates an average temperature of a display panel 120 in a first time period. Step S401 is similar to step S301 shown in FIG. 3, and details are not described herein again.

In step S402, the processor 110 determines whether the average temperature of the display panel 120 is greater than a first temperature threshold. If the average temperature (in an embodiment, 43.9° C.) of the display panel 120 is not greater than the first temperature threshold (in an embodiment, 45° C.), an upper brightness limit of the display panel 120 is not corrected, and step S401 is performed again. If the average temperature (in an embodiment, 47° C. or 52° C.) of the display panel 120 is greater than the first temperature threshold (in an embodiment, 45° C.), step S403 is performed.

In step S403, the processor 110 determines whether the average temperature of the display panel 120 is greater than a second temperature threshold. In an embodiment, the second temperature threshold is greater than the first temperature threshold. When the average temperature (in an embodiment, 47° C.) of the display panel 120 is greater than the first temperature threshold (in an embodiment, 45° C.) but not greater than the second temperature threshold (in an embodiment, 50° C.), step S405 is performed. In step S405, the processor 110 calculates a first adjusted maximum brightness value. In an embodiment, the first adjusted maximum brightness value is inferred from a service life curve of the display panel 120 at different temperatures. In an embodiment, the first adjusted maximum brightness value (in an embodiment, 320 nits) is less than an original maximum brightness value (in an embodiment, 350 nits). After step S405, steps S408 and S409 are performed. Steps S408 and S409 are similar to steps S304 and S305 shown in FIG. 3, and details are not described herein again.

When the average temperature (in an embodiment, 52° C.) of the display panel 120 is greater than the first temperature threshold (in an embodiment, 45° C.) and greater than the second temperature threshold (in an embodiment, 50° C.), step S404 is performed. In step S404, the processor 110 calculates a second adjusted maximum brightness value. In an embodiment, the second adjusted maximum brightness value (in an embodiment, 270 nits) is less than the first adjusted maximum brightness value (in an embodiment, 320 nits). It is to be noted that, the first temperature threshold, the second temperature threshold, the first adjusted maximum brightness value, and the second adjusted maximum brightness value are determined by analyzing a relationship among the brightness, the temperature, and the service life of the display panel 120. After step S404, steps S406 and S407 are performed. Steps S406 and S407 are similar to steps S304 and S305 shown in FIG. 3, and details are not described herein again.

In the embodiment shown in FIG. 4, the higher the average temperature of the display panel 120 is, the more the maximum brightness of the display panel 120 is reduced. In other words, through the display panel control method 400 shown in FIG. 4, the electronic device in the foregoing embodiments dynamically adjusts the maximum brightness of the display panel 120.

In conclusion, an electronic device of the disclosure selectively corrects an upper brightness limit of a display panel according to a result of comparison between an average temperature of the display panel and a temperature threshold, to prolong a service life of the display panel and reduce occurrence of afterimages.

Although the content of the disclosure has been disclosed above by using the implementations, the implementations are not used to limit the content of the disclosure. A person of ordinary skill in the art may make various variations and modifications without departing from the spirit and scope of the content of the disclosure. Therefore, the protection scope of the content of the disclosure is defined by the appended claims.

What is claimed is:

1. An electronic device, comprising:
a display panel; and
a processor, coupled to the display panel, and configured to calculate an average temperature of the display panel in a first time period, wherein the processor adjusts an upper brightness limit of the display panel from an original maximum brightness value to a first adjusted maximum brightness value when the average temperature is greater than a first temperature threshold, so that brightness of the display panel is not greater than the first adjusted maximum brightness value in a second time period, wherein the processor adjusts the upper brightness limit from the first adjusted maximum brightness value back to the original maximum brightness value after the second time period.

2. The electronic device according to claim 1, wherein the display panel is coupled to a first temperature sensor, the first temperature sensor is configured to detect a temperature of the display panel to generate a first temperature value, and the processor calculates the average temperature of the display panel according to a plurality of first temperature values outputted by the first temperature sensor in the first time period.

3. The electronic device according to claim 1, wherein the electronic device further comprises a second temperature sensor, the second temperature sensor is configured to detect a temperature of the processor to generate a second temperature value, and the processor receives a plurality of second temperature values outputted by the second temperature sensor in the first time period, and converts the second temperature values into a plurality of temperature values of the display panel, to calculate the average temperature of the display panel.

4. The electronic device according to claim 1, wherein the electronic device further comprises a fan, the processor is coupled to the fan, records a plurality of rotation speed values of the fan in the first time period, and converts the rotation speed values of the fan into a plurality of temperature values of the display panel, to calculate the average temperature of the display panel.

5. The electronic device according to claim 1, wherein when the average temperature is greater than the first temperature threshold and greater than a second temperature threshold, the processor adjusts the upper brightness limit of the display panel to a second adjusted maximum brightness value, wherein the second temperature threshold is greater than the first temperature threshold, and the second adjusted maximum brightness value is less than the first adjusted maximum brightness value.

6. A display panel control method, applicable to an electronic device, the method comprising:
calculating an average temperature of a display panel of the electronic device in a first time period;
correcting an original maximum brightness value of the display panel to a first adjusted maximum brightness value when the average temperature is greater than a first temperature threshold;
correcting, when current brightness of the display panel is greater than the first adjusted maximum brightness value, the current brightness of the display panel so that the current brightness of the display panel is not greater than the first adjusted maximum brightness value in a second time period; and
correcting the first adjusted maximum brightness value back to the original maximum brightness value after the second time period.

7. The display panel control method according to claim 6, wherein a step of calculating the average temperature of the display panel comprises:
receiving a plurality of temperature values of the display panel in the first time period; and
calculating the average temperature of the display panel according to the temperature values of the display panel.

8. The display panel control method according to claim 6, wherein a step of calculating the average temperature of the display panel comprises:
receiving a plurality of temperature values of a processor of the electronic device in the first time period;
converting the temperature values of the processor into a plurality of temperature values of the display panel; and calculating the average temperature of the display panel according to the temperature values of the display panel.

9. The display panel control method according to claim 6, wherein a step of calculating the average temperature of the display panel comprises:
recording a plurality of rotation speed values of a fan of the electronic device in the first time period;
converting the rotation speed values of the fan into a plurality of temperature values of the display panel; and
calculating the average temperature of the display panel according to the temperature values of the display panel.

10. The display panel control method according to claim 6, wherein when the average temperature is greater than the first temperature threshold and greater than a second temperature threshold, the original maximum brightness value is corrected to a second adjusted maximum brightness value, wherein the second temperature threshold is greater than the first temperature threshold, and the second adjusted maximum brightness value is less than the first adjusted maximum brightness value.

* * * * *